(12) United States Patent
Hesse et al.

(10) Patent No.: US 11,287,790 B2
(45) Date of Patent: Mar. 29, 2022

(54) METHOD FOR STARTING UP A CONTROLLER SYSTEM, AND CONTROLLER SYSTEM

(71) Applicant: Lenze Automation GmbH, Aerzen (DE)

(72) Inventors: Peter Hesse, Hameln (DE); Dirk Duesterberg, Emmerthal (DE); Thomas Gentzen, Cremlingen (DE)

(73) Assignee: Lenze Automation GmbH, Aerzen (DE)

( * ) Notice: Subject to any disclaimer, the term of this patent is extended or adjusted under 35 U.S.C. 154(b) by 93 days.

(21) Appl. No.: 16/641,389

(22) PCT Filed: Aug. 2, 2018

(86) PCT No.: PCT/EP2018/071000
§ 371 (c)(1),
(2) Date: Feb. 24, 2020

(87) PCT Pub. No.: WO2019/038046
PCT Pub. Date: Feb. 28, 2019

(65) Prior Publication Data
US 2020/0192316 A1    Jun. 18, 2020

(30) Foreign Application Priority Data
Aug. 25, 2017    (DE) ..................... 10 2017 214 892.6

(51) Int. Cl.
*G05B 19/04*    (2006.01)
*G05B 19/042*    (2006.01)

(52) U.S. Cl.
CPC .............. *G05B 19/0426* (2013.01); *G05B 2219/23427* (2013.01); *G05B 2219/23429* (2013.01)

(58) Field of Classification Search
CPC ...... G05B 19/0426; G05B 2219/23427; G05B 2219/23429
See application file for complete search history.

(56) References Cited

U.S. PATENT DOCUMENTS

| | | | |
|---|---|---|---|
| 6,272,398 B1* | 8/2001 | Osborne | ............... B29C 45/76 700/245 |
| 6,393,342 B2 | 5/2002 | Bauer et al. | |

(Continued)

FOREIGN PATENT DOCUMENTS

| | | |
|---|---|---|
| DE | 199 64 013 A1 | 7/2001 |
| DE | 10 2007 062 395 A1 | 6/2009 |

(Continued)

OTHER PUBLICATIONS

Dewey, Alan R. "Fieldbus device maintenance—do I need to go to the field anymore." Proceedings ISA Tech/Expo Technology Update Conference. vol. 402. 2000. (Year: 2000).*

(Continued)

*Primary Examiner* — Michael D Masinick
(74) *Attorney, Agent, or Firm* — Crowell & Moring LLP

(57) ABSTRACT

A method for starting up a controller system having at least one electric controller and a plurality of hardware modules of different types which can be coupled to the controller. To each type of hardware module there is assigned a type-specific parameter set and a type-specific control program. A respective parameter set has a quantity of parameters with adjustable parameter values. The method has the steps of: coupling a hardware module to the controller, determining the type of the coupled hardware module by way of the controller, selecting the type-specific control program by way of the controller, and by way of the controller, selecting the type-specific parameter set as an adjustable parameter set.

7 Claims, 1 Drawing Sheet

(56) References Cited

U.S. PATENT DOCUMENTS

| | | | |
|---|---|---|---|
| 7,184,917 B2* | 2/2007 | Pramanick | G01R 31/3183 |
| | | | 702/108 |
| 8,229,578 B2* | 7/2012 | Law | G06F 8/10 |
| | | | 700/23 |
| 9,241,043 B2 | 1/2016 | Haberer et al. | |
| 10,346,103 B2 | 7/2019 | Haas et al. | |
| 2001/0044677 A1 | 11/2001 | Bauer et al. | |
| 2009/0138693 A1* | 5/2009 | Chomik | G05B 19/0423 |
| | | | 713/1 |
| 2011/0098830 A1* | 4/2011 | Weddingfeld | G05B 19/0426 |
| | | | 700/79 |
| 2013/0053987 A1* | 2/2013 | Galt | G05B 19/0423 |
| | | | 700/12 |
| 2014/0164550 A1* | 6/2014 | Haberer | H04L 12/40032 |
| | | | 709/213 |
| 2016/0170388 A1 | 6/2016 | Haas et al. | |
| 2017/0242601 A1* | 8/2017 | Rantanen | G05B 19/0426 |
| 2020/0192316 A1* | 6/2020 | Hesse | G05B 19/0426 |

FOREIGN PATENT DOCUMENTS

| | | |
|---|---|---|
| DE | 10 2011 102 770 A1 | 11/2012 |
| DE | 20 2015 102 520 U1 | 10/2015 |
| DE | 10 2014 118 290 A1 | 6/2016 |
| EP | 2 741 451 A1 | 6/2014 |

OTHER PUBLICATIONS

International Search Report (PCT/ISA/210) issued in PCT Application No. PCT/EP2018/071000 dated Oct. 30, 2018 with English translation (five (5) pages).

German-language Written Opinion (PCT/ISA/237) issued in PCT Application No. PCT/EP2018/071000 dated Oct. 30, 2018 (five (5) pages).

\* cited by examiner

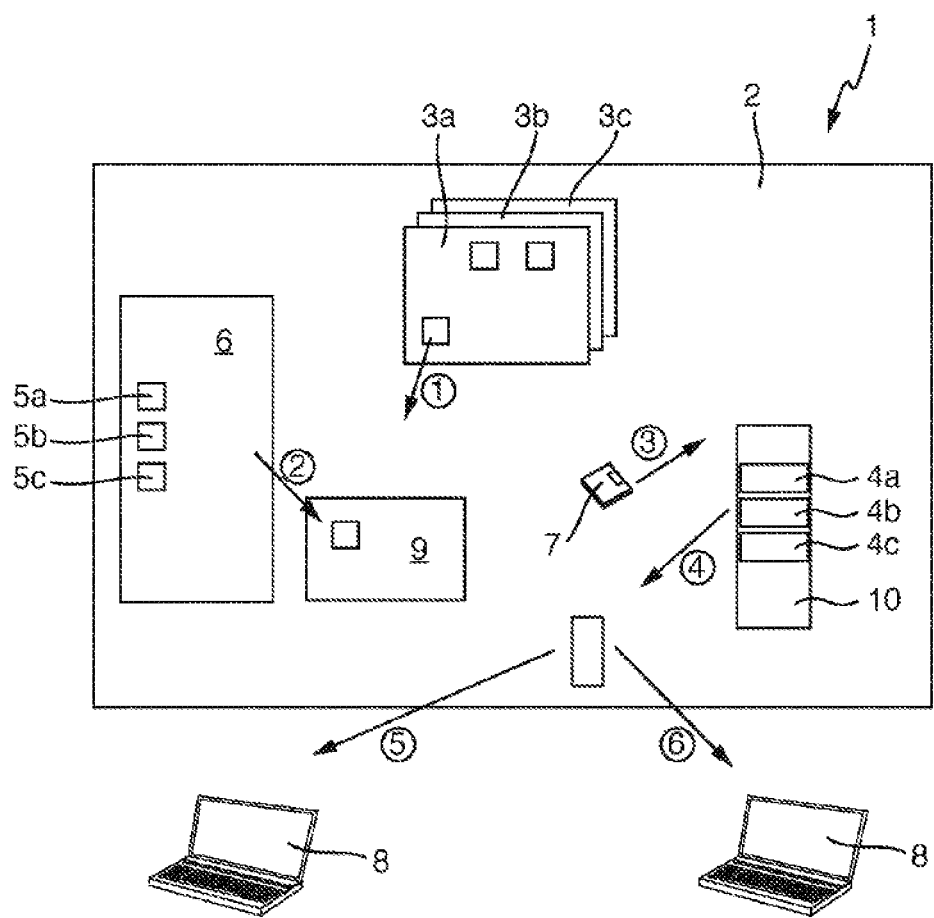

METHOD FOR STARTING UP A CONTROLLER SYSTEM, AND CONTROLLER SYSTEM

BACKGROUND AND SUMMARY OF THE INVENTION

The invention relates to a method for starting up a controller system and to a controller system.

The invention is based on the object of providing a method for starting up a controller system and a controller system which can be parameterized in a simple, flexible and reliable manner.

The invention achieves this object by means of a method for starting up a controller system having at least one electrical controller, and a plurality of hardware modules of different types which can be coupled to the controller, wherein a type-specific parameter set and a type-specific control program are assigned to each type of hardware module, wherein a respective parameter set has a set of parameters with adjustable parameter values, and wherein the method has the steps of: coupling a hardware module to the controller; using the controller to determine the type of coupled hardware module; using the controller to select the type-specific control program; and using the controller to select the type-specific parameter set as the adjustable parameter set. The invention also achieves this object by providing a controller system having at least one electrical controller and a plurality of hardware modules of different types which can be coupled to the controller, wherein a type-specific parameter set and a type-specific control program are assigned to each type of hardware module, wherein a respective parameter set has a set of parameters with adjustable parameter values, and wherein the controller is configured to carry out the method.

The method is used to start up a controller system.

The controller system has one or more electrical controllers.

The controller system also has a plurality of hardware modules which are separate from the controller and can be coupled to the controller, for example by virtue of the hardware module being plugged into a slot of the controller provided for this purpose. The controller system has hardware modules of different types; in particular, at least two different types of hardware modules are provided in the controller system. A type-specific parameter set and a type-specific control program are assigned to each type of hardware module, wherein a respective parameter set has a set of parameters with adjustable parameter values. The set can have between one and one hundred parameters, for example, depending on the type.

In a manner organized according to different types of hardware modules, adjustable parameters may be selected, for example, from:

Field bus parameters: Station name, IO address, Watchdog reaction, . . .

Transducer parameters: Number of pole pairs, Supply voltage, Increments per revolution, . . .

Safety parameters: SS1-Stop-Time, SLS-Limited-Speed, SLP-Lower-Position-Limit, . . .

The method according to the invention has the following steps.

One of the hardware modules is coupled to the controller, for example by virtue of it being plugged into a slot of the controller provided for this purpose.

The controller determines the type of coupled hardware module by virtue of the controller reading a type identifier of the hardware module, for example, from a register of the hardware module provided for this purpose.

The controller selects and loads the appropriate type-specific control program, for example driver software appropriate for the type of coupled hardware module.

The controller selects the type-specific parameter set as the adjustable parameter set, that is to say those parameters in that parameter set which corresponds to the type of coupled hardware module are adjustable.

According to one embodiment, the hardware modules are field bus modules for field buses of different types, for example PROFINET field bus modules, EtherCAT field bus modules or Ethernet/IP field bus modules. The hardware modules can also be transducer modules for transducers of different types, for example rotary encoders etc. The hardware modules can also be safety modules of different types.

According to one embodiment, the control program is selected from a memory inside the controller, wherein the memory inside the controller is designed to store all type-specific control programs. The memory inside the controller can either be held persistently on the electrical controller or loaded from a memory outside the controller upon starting.

According to one embodiment, all type-specific parameter sets are loaded from a memory outside the controller into a parameter set memory inside the controller, and the type-specific parameter set is selected from the parameter set memory inside the controller. The memory outside the controller may be, for example, a removable storage medium which can be coupled to the controller, for example an SD card.

According to one embodiment, values of parameters in the loaded parameter set are adjusted and then stored. This can be carried out, for example, by means of a user interface of the controller and/or by means of an operating device which can be coupled to the controller for the purpose of interchanging data.

According to one embodiment, the controller is a frequency converter, a servo converter or a so-called motion controller. Motion controllers are electrical controllers for regulating or controlling movement, which can be used to influence a pose, a speed, an acceleration or a combination thereof. A typical use is, for example, point-to-point position regulation and speed regulation.

According to one embodiment, the controller system has an operating device, for example in the form of a portable computer, which can be operated in a start-up mode and in a diagnostic mode. For this case, the operating device is coupled to the controller in a wired or wireless manner for the purpose of interchanging data. The parameters in all type-specific parameter sets are visible and adjustable in the start-up mode irrespective of the type of hardware module coupled to the controller. In contrast, only the parameters in the parameter set corresponding to the type of hardware module coupled to the controller are visible and adjustable in the diagnostic mode.

The controller system according to the invention has at least one electrical controller, and a plurality of hardware modules of different types which can be coupled to the controller, wherein a type-specific parameter set and a type-specific control program are assigned to each type of hardware module, wherein a respective parameter set has a set of parameters with adjustable parameter values. The controller is designed to carry out the method described above.

According to one embodiment, the controller system has an operating device which is designed to adjust the parameter values.

BRIEF DESCRIPTION OF THE DRAWINGS

The invention is described in detail below with reference to the drawing, in which:

FIG. 1 schematically shows a controller system having an electrical controller, which is started up by means of a method according to the invention.

DETAILED DESCRIPTION OF THE DRAWINGS

FIG. 1 schematically shows a controller system 1. The controller system 1 has, by way of example, an electrical controller 2 in the form of a frequency converter. It goes without saying that the controller system 1 can have a multiplicity of controllers.

The controller system 1 also has a plurality of (here, three by way of example) hardware modules 3a, 3b, 3c of different types which can be coupled to the controller 2. In the present case, the hardware modules 3a, 3b, 3c are field bus modules for field buses of different types; for example, the hardware module 3a is a PROFINET field bus module, the hardware module 3b is an EtherCAT field bus module, and the hardware module 3c is an Ethernet/IP field bus module.

A type-specific driver program or control program 5a, 5b, 5c is assigned to each type of hardware module 3a, 3b, 3c, wherein the control program 5a is, for example, a PROFINET stack, the control program 5b is an EtherCAT stack, and the control program 5c is an Ethernet/IP stack. The control programs 5a, 5b, 5c are stored in a memory 6 inside the controller 2.

A type-specific parameter set 4a, 4b, 4c is also assigned to each type of hardware module 3a, 3b, 3c, wherein a respective parameter set 4a, 4b, 4c has a set of parameters with adjustable parameter values which need to be adjusted in a suitable manner during start-up.

The controller 2 is started up as follows.

In a step 1 (symbolized by the number 1 inside a circle), one of the hardware modules 3a, 3b or 3c is coupled to the controller 2 by virtue of it being plugged into a plug connection of the controller 2 provided for this purpose, for example. The controller 2 now identifies the type of hardware module which has been plugged in. A type-specific identifier can be written to each hardware module 3a, 3b or 3c, for example during its manufacture, and stipulates whether a PROFINET, an EtherCAT or an Ethernet/IP field bus module is involved, for example. This identifier is read out in a boot sequence of the controller 2, with the result that the controller 2 has knowledge of the type of hardware module which has been plugged in.

In a step 2 (symbolized by the number 2 inside a circle), the controller 2 selects the control program matching the identified type of hardware module from the memory 6 and loads the selected control program into an FPGA 9. The control program contains all IP cores/stacks required for the field bus used. On the basis of the control program which has been loaded, the FPGA then processes a protocol stack matching the field bus used.

In a step 3 (symbolized by the number 3 inside a circle), the controller 2 loads all parameter sets 4a to 4c belonging to the hardware modules 3a, 3b, 3c from an SD card 7 into an internal parameter set memory 10. Alternatively, the parameter sets 4a to 4c can also be loaded from a superordinate control system.

In a step 4 (symbolized by the number 4 inside a circle), the controller 2 then selects the parameter set matching the identified type of hardware module from the parameter set memory 10, and then loads the selected parameter set as the adjustable parameter set, with the result that the parameters in the loaded parameter set are available for parameterizing the electrical controller 2.

These steps make it possible to implement a project for different field bus connections. If a PROFINET hardware module is plugged in, the PROFINET stack and the PROFINET parameters are also available; if another hardware module is plugged in, the corresponding data are loaded.

The controller system 1 may have an operating device 8 which is designed to adjust the parameter values.

The operating device can be operated in a start-up mode, illustrated on the left by way of example, and in a diagnostic mode, illustrated on the right by way of example.

The parameters in all type-specific parameter sets 4a, 4b, 4c are visible and adjustable in the start-up mode irrespective of the type of hardware module 3a, 3b, 3c coupled to the controller 2, symbolized by way of example by the number 5 inside a circle.

In contrast, only the parameters in that parameter set 4a, 4b, 4c which corresponds to the type of hardware module 3a, 3b, 3c coupled to the controller 2 are visible and adjustable in the diagnostic mode, symbolized by the number 6 inside a circle.

In other words, all parameters of all possible field buses are displayed in the start-up mode and can be adjusted by a start-up engineer. That is to say, during start-up, all field buses can be parameterized regardless of whether or not they are currently plugged in as a module. The start-up mode should be adjusted for a system developer, for example when planning the controller system, whereas the diagnostic mode is useful for an end user who would only like to parameterize the actually prevailing configuration.

The embodiments were described in the context of hardware modules in the form of field bus modules. It goes without saying that the invention can also be used in the context of all hardware modules which can be coupled to the controller and which entail a higher degree of software complexity in the controller. In particular, this applies to transducer modules and/or safety modules, especially if they use higher-quality and more complex protocols.

What is claimed is:

1. A method for starting up a controller system, comprising:
    at least one electrical controller; and
    a plurality of hardware modules of different types which are couplable to the controller, wherein a type-specific parameter set and a type-specific control program are assigned to each type of hardware module, and wherein a respective parameter set has a set of parameters with adjustable parameter values,
    wherein the method comprises the steps of:
    coupling a hardware module to the controller;
    using the controller to determine the type of coupled hardware module;
    using the controller to select the type-specific control program;
    using the controller to select the type-specific parameter set as the adjustable parameter set; and
    coupling an operating device which is operable in a start-up mode and in a diagnostic mode to the controller, wherein the parameters in all type-specific parameter sets are visible and adjustable in the start-up mode irrespective of the type of hardware module coupled to the controller, and wherein only the parameters in the parameter set corresponding to the type of hardware module coupled to the controller are visible and adjustable in the diagnostic mode.

2. The method according to claim 1, wherein
the hardware modules are field bus modules for field buses of different types,
the hardware modules are transducer modules for transducers of different types, and/or
the hardware modules are safety modules of different types.

3. The method according to claim 1, wherein the control program is selected from a memory inside the controller.

4. The method according to claim 1, wherein
all type-specific parameter sets are loaded from a memory outside the controller into a parameter set memory inside the controller, and
the type-specific parameter set is selected from the parameter set memory inside the controller.

5. The method according to claim 4, further comprising the steps of:
adjusting values of parameters in the loaded parameter set; and
storing the adjusted values.

6. The method according to claim 1, wherein the controller is a frequency converter, a servo converter or a motion controller.

7. A controller system, comprising:
at least one electrical controller;
a plurality of hardware modules of different types which are couplable to the controller, wherein a type-specific parameter set and a type-specific control program are assigned to each type of hardware module, wherein a respective parameter set has a set of parameters with adjustable parameter values; and
an operator device, which is operable in a start-up mode and in a diagnostic mode, coupled to the controller, wherein the parameters in all type-specific parameter sets are visible and adjustable in the start-up mode irrespective of the type of hardware module coupled to the controller, and wherein only the parameters in the parameter set corresponding to the type of hardware module coupled to the controller are visible and adjustable in the diagnostic mode,
wherein the controller is configured to execute the acts of:
determining a type of hardware module coupled to the controller;
selecting the type-specific control program; and
selecting the type-specific parameter set as the adjustable parameter set.

* * * * *